Jan. 24, 1967  MASARU YAMAMOTO  3,300,271
SHUTTER MECHANISM FOR A MOTION PICTURE CAMERA
Filed Oct. 1, 1964
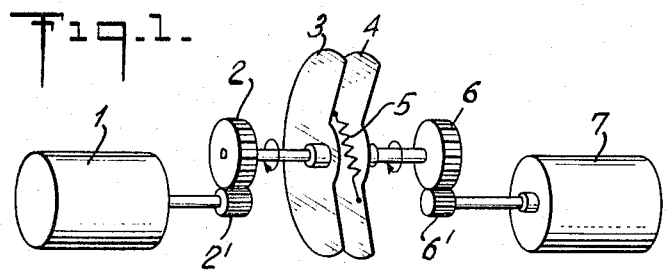
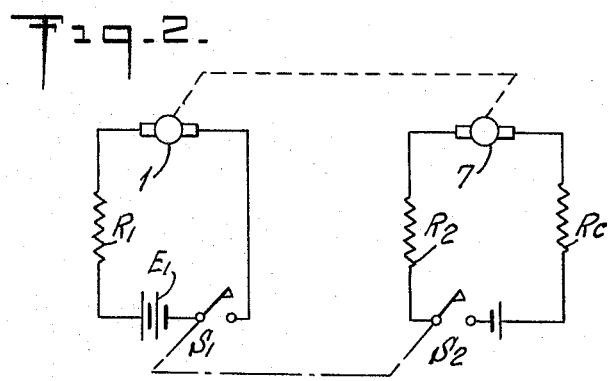
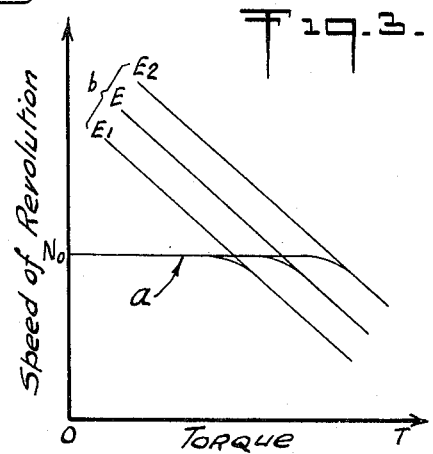
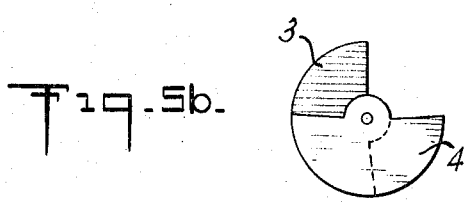
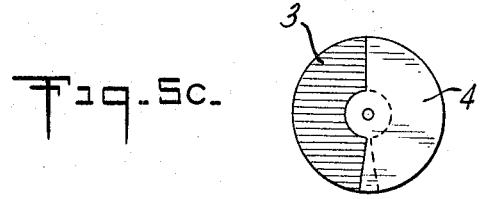
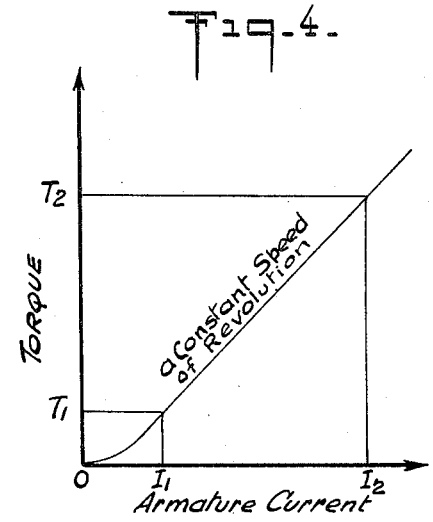
INVENTOR
MASARU YAMAMOTO
BY Stanley W. Coler
ATTORNEY United States Patent Office 3,300,271
Patented Jan. 24, 1967

3,300,271
SHUTTER MECHANISM FOR A MOTION
PICTURE CAMERA
Masaru Yamamoto, Otaku, Tokyo, Japan, assignor to
Yashica Co., Ltd., a corporation of Japan
Filed Oct. 1, 1964, Ser. No. 400,863
7 Claims. (Cl. 352—214)

The present invention relates generally to improvements in cameras and it relates more specifically to an improved shutter mechanism for motion picture cameras.

The conventional motion picture camera generally includes a rotatable shutter blade which is disposed between the camera lens and the framing window registering with the path of the advancing film. The camera blade is rotated by a spring wound or electric motor and the rotational speed is usually adjustable. There have been proposed many mechanisms for adjusting or varying the opening of the shutter blade and hence the corresponding shutter speed but these possess many drawbacks and disadvantages. A common expedient has been the provision of a pair of overlapping coaxial shutter blades which are resiliently joined by spring means so as to rotate in a common direction at substantially the same speed. A drive motor is connected to a first or the principal shutter blade to rotate the same and the first shutter blade in turn rotates the second or subordinate shutter blade. The blades are sector shaped and delineate an opening whose aperture or size is determined by the angular or phase relationship between the shutter blades. In order to adjust the angular relationship between the shutter blades an adjustable braking force is applied to the subordinate shutter blade in accordance with the desired aperture. One method of braking the subordinate blade is to couple it in a driving arrangement with a generator having a variable resistance load, the braking force increasing with a decrease in the load resistance. The generator load resistance may be photosensitive so as to be controlled by the incident light.

Adjustable shutters of the above nature, wherein an adjustable braking force is applied to the subordinate shutter are highly unsatisfactory. The braking force usually required to obtain the desired adjustment of the subordinate shutter relative to the principal shutter is exceedingly high and even in so small a device as an eight millimeter camera, is of the order of several hundred ampere turns of magnetomotive force rendering such shutter aperture adjustment generally impractical. On the other hand any decrease in the required braking force necessitates a degree of precision and tolerance which is extremely difficult and costly in the design and production of commercial devices. Accordingly, the variable aperture motion picture shutter mechanisms as heretofore proposed are expensive and unreliable and otherwise leave much to be desired.

It is therefore a principal object of the present invention to provide an improved motion picture camera.

Another object of the present invention is to provide an improved shutter mechanism for motion picture cameras.

Still another object of the present invention is to provide an improved motion picture camera shutter mechanism provided with an adjustable aperture or opening.

A further object of the present invention is to provide an improved electrically driven, adjustable aperture motion picture shutter mechanism.

Still a further object of the present invention is to provide a motion picture shutter mechanism of the above nature characterized by its simplicity, ruggedness, reliability, versitility, efficiency and low cost.

The above and other objects of the present invention will become apparent from a reading of the following description taken in conjunction with the accompanying drawing wherein:

FIGURE 1 is a perspective view of a motion picture camera shutter mechanism embodying the present invention;

FIGURE 2 is a circuit diagram thereof;

FIGURE 3 is a graph illustrating a family of voltage curves of the drive motor torque versus speed characteristics;

FIGURE 4 is a graph illustrating the drive motor armature torque versus current characteristics; and FIGURES 5a to 5c are front views of the shutter blades in fully open, half open, and fully closed aperture positions respectively.

The present invention in a sense contemplates the provision of a motion picture camera shutter mechanism comprising a pair of first and second longitudinally aligned shutter blades rotatable about a longitudinal axis, means normally resiliently urging said blades to a predetermined mutual angular relationship, first and second electric drive motors coupled to said first and second shutter blades respectively to drive said shutter blades in a common direction, means connecting said first motor to a source of electric current, and means including a variable resistor connecting said second motor to a source of current.

The aforesaid shutter mechanism is characterized by its compactness, reliability and high efficiency. An important and basic feature of the present inproved mechanism resides in the fact that there is no primary or braking force required or applied to the shutter mechanism and that the energy is applied substantially solely to driving the shutters. As a consequence a variable aperture shutter is achieved with no sacrifice in efficiency, reliability or compactness.

Referring now to the drawings which illustrate a preferred embodiment of the present invention, the improved shutter mechanism includes a pair of cooperating substantially overlapping shutter blades 3 and 4 of similar sector shape, each of which extends for slightly more than 180°. The pair of shutter blades 3 and 4 are positioned between the camera picture lens and the picture framing element disposed along the path of the advancing film at about the focal plane of the picture lens in the manner well known in the art.

The shutter blades 3 and 4 are individually mounted in any suitable manner on separate coaxial drive shafts which have affixed thereto gears 2 and 6 respectively. A first D.C. electric drive motor 1 is provided with a drive shaft carrying a spur gear 2' engaging the gear 2 and a second D.C. electric drive motor 7 is provided with a drive shaft carrying a spur gear 6' engaging the gear 6. A spring 5 interconnects opposite radial edges of the shutter blades 3 and 4 whereby to intercouple the shutter blades and assure the substantially same rotational speed thereof while permitting their relative angular or phase adjustment.

The first electric motor 1 is connected in series through a first resistor R1 and a switch S1 to a voltage source, such as a battery E1 and the second electric motor 7 is connected in series through a second resistor R2 a variable resistor Rc and a switch S2 to a second voltage source such as a battery E2. The switches S1 and S2 are ganged so as to be simultaneously opened or closed whereby to concurrently energize and de-energize the motors 1 and 7.

The motors 1 and 7 rotate at substantially the same constant speed but vary only in torque within a predetermined range of the source voltage whereby the shutter blades 3 and 4 rotate in substantial unison when the supply voltage is within said predetermined range as illustrated in FIGURE 3 of the drawings.

The drive motors 1 and 7, however, possess a linear relationship in their armature current versus torque within the predetermined range as indicated in the graph of FIGURE 4 ($I_1$–$I_2$ versus $T_1$–$T_2$) and require increased current with an increase in the torque load. As a consequence, if the current supply of one of the motors is adjusted, that is the motor 7 by adjusting the variable resistor $Rc$, the torque thereof is correspondingly altered to thereby change the equilibrium conditions between said torque and the force of the coupling spring 5 and to effect a relative angular displacement between the shutter blades 3 and 4 to correspond to the changed equilibrium condition. The aforesaid displacement represents an adjustment in the shutter aperture and hence the shutter speed corresponding to the new equilibrium position.

The variable resistor $Rc$ may be of the manually adjustable type which permits the selective manual adjustment of the torque of the motor 7 and hence the shutter blade relationship and hence the aperture or speed thereof. Advantageously, however, the variable resistor $Rc$ is a photosensitive or photoresistance element such as a cadmium sulfide cell or the like which is exposed to light incident on the camera lens whereby to automatically effect the shutter opening or speed. With an increase in the light incident on the photoresistance element $Rc$ the current to the motor 7 increases to increase the torque thereof and effect a corresponding displacement of the shutter blade 4 relative to the shutter blade 3 to reduce the shutter aperture and hence increase the speed thereof. Similarly a decrease in the incident light results in a decrease in the shutter speed.

As seen in FIGURE 5 of the drawings the shutter blades may be continuously relatively varied from a fully open position with the shutter blades coinciding and corresponding to approximately 180° to a substantially fully closed position. In accordance with a preferred form of the present shutter mechanism, the shutter blades 3 and 4 are so shaped, related and relatively adjustable that there are provided an exposure time of one two thousandths ($\frac{1}{2000}$) second at the opening angle of two degrees and thirty minutes (2°30′), one thousandth ($\frac{1}{1000}$) second at five degrees (5°), one five hundreths ($\frac{1}{500}$) second at ten degrees (10°), one two hundred and fiftieth ($\frac{1}{250}$) second at twenty degrees (20°), one hundred and twenty-fifth ($\frac{1}{125}$) sec. at forty degrees (40°), one sixtieth ($\frac{1}{60}$) sec. at eighty degrees (80°), and one thirtieth ($\frac{1}{30}$) sec. at one hundred and sixty degrees (160°) each at the constant frame speed of sixteen frames per second.

While there have been described and illustrated preferred embodiments of the present invention it is apparent that numerous alterations, omissions and additions may be made without departing from the spirit thereof. For example, while the motors and the photoresistance element $Rc$ advantageously have linear responses, torque versus current and resistance versus light intensity respectively, they may be non-linear in a manner which are mutually compensating. Moreover, although two switches S1 and S2 and two batteries E1 and E2 are employed, a single common battery or a single common switch, or both may be substituted for the pair of switches and the pair of batteries respectively. In addition, the variable resistor $Rc$ may include a parallel photoresistance element and a manually variable resistor with switch means for selectively alternatively placing these in the control circuit. The present control network may be tied in with a corresponding light controlled automatic diaphragm to provide a complete wide range automatic control.

What is claimed is:

1. A motion picture camera shutter mechanism comprising a pair of first and second longitudinally aligned shutter blades rotatable about a longitudinal axis, means normally resiliently urging said blades to a predetermined mutual angular relationship, first and second electric drive motors coupled to said first and second shutter blades respectively to drive said shutter blades in a common direction, means connecting said first motor to a source of electric current and means including a variable impedance connecting said second motor to a source of current.

2. A motion picture camera shutter mechanism comprising a pair of first and second coaxial substantially sector shaped rotatable shutter blades, means normally resiliently urging said blades to a predetermined mutual angular relationship, first and second electric drive motors coupled to said first and second shutter blades respectively to drive said shutter blades in a common direction, means connecting said first motor to a source of electric current and means including a variable resistor connecting said second motor to a source of current.

3. A motion picture camera shutter mechanism comprising a pair of first and second coaxial substantially overlapping substantially sector shaped rotatable shutter blades, means normally resiliently urging said blades to a predetermined mutual angular relationship, first and second electric drive motors coupled to said first and second shutter blades respectively to drive said shutter blades in a common direction, means connecting said first motor to a source of electric current and means including a variable resistor connecting said second motor to a source of current.

4. The camera shutter mechanism of claim 3 wherein said variable resistor is manually adjustable.

5. The camera shutter mechanism of claim 3 wherein said variable resistor comprises a photoresistance element.

6. The camera shutter mechanism of claim 3 including switching means for simultaneously connecting and disconnecting said motors to said source of current.

7. The camera shutter mechanism of claim 3 including ganged first and second switches and first and second sources of current said first motor being connected through said first switch to said first current source and said second motor being connected through said second switch to said second current source.

References Cited by the Examiner

UNITED STATES PATENTS 2,166,947  7/1939  Fayerweather.

JULIA E. COINER, *Primary Examiner.*